(12) United States Patent
Satchell et al.

(10) Patent No.: US 7,240,026 B2
(45) Date of Patent: Jul. 3, 2007

(54) METHOD, APPARATUS, AND COMPUTER-READABLE MEDIUM FOR INTEGRATION OF ONLINE AND OFFLINE COMMERCE

(75) Inventors: Lesa Satchell, Shrewsbury, MA (US); Charles Maurice Hall, Charlton, MA (US); Keith G. Gregg, Westborough, MA (US); Marc F. Schultz, Sudbury, MA (US); Robin C. Shawver, Franklin, MA (US); George Lamson, Leicester, MA (US); Scott J. Floeck, Plymouth, MA (US)

(73) Assignee: Staples the Office Superstore, LLC, Framingham, MA (US)

( * ) Notice: Subject to any disclaimer, the term of this patent is extended or adjusted under 35 U.S.C. 154(b) by 0 days.

(21) Appl. No.: 11/179,854

(22) Filed: Jul. 12, 2005

(65) Prior Publication Data

US 2005/0246245 A1 Nov. 3, 2005

Related U.S. Application Data

(63) Continuation-in-part of application No. 10/020,591, filed on Dec. 14, 2001, now abandoned.

(51) Int. Cl.
*G06Q 30/00* (2006.01)

(52) U.S. Cl. .................................................. 705/26
(58) Field of Classification Search ................. 705/1, 705/26, 27
See application file for complete search history.

(56) References Cited

U.S. PATENT DOCUMENTS 5,903,652 A * 5/1999 Mital ........................... 705/78

OTHER PUBLICATIONS

Brian Alexander, The Kiosk, Where Brick Meets Click, The New York Times, Dec. 13, 2000, p. H18.*

* cited by examiner

*Primary Examiner*—Ronald Laneau
(74) *Attorney, Agent, or Firm*—Wolf, Greenfield & Sacks, P.C.

(57) ABSTRACT

Methods and apparatus are provided for integrating online and offline commerce. In one exemplary embodiment, a customer may select a first item from goods or services offered by a web site accessible from a vendor's place of business, select a second item from a source separate from the web site (e.g., from stock maintained at the vendor's place of business), and purchase both the first and second items in a single transaction. The vendor then initiates shipment of the first item from a separate location.

16 Claims, 6 Drawing Sheets

METHOD, APPARATUS, AND COMPUTER-READABLE MEDIUM FOR INTEGRATION OF ONLINE AND OFFLINE COMMERCE

CROSS-REFERENCE TO RELATED APPLICATIONS

This application is a continuation-in-part of, and claims benefit under 35 U.S.C. §120 to, U.S. patent application Ser. No. 10/020,591, filed Dec. 14, 2001, now abandoned entitled "Method, Apparatus and Computer-Readable Medium for Integrating Online and Offline Commerce."

FIELD OF THE INVENTION

This invention relates to commerce which is, at least in part, electronic commerce, and more particularly, to methods, apparatus and computer-readable media for facilitating internet-based purchases.

BACKGROUND OF THE INVENTION

Over the past several years, the global internet and associated technologies have revolutionized the way in which a business is able to engage in transactions with customers. The World Wide Web portion of the internet has made it cost-effective for businesses to reach a larger audience of potential customers and more convenient for customers to shop at their leisure. Businesses can, using internet-based product advertisements disseminated across multiple web sites, provide a vehicle for a customer to "click through" to a spot on the business's web site where a purchase can be consummated instantly. Security technology has advanced sufficiently to allow customers to trust their ability to make purchases using a credit card. Further, the internet allows businesses to remove logistical barriers to a customer's purchase, by enabling customers 24-hour access to products, and by eliminating the need for customers to travel to the business's physical location.

Despite appearances, however, internet-based commerce has in many respects made transactions more difficult. From the seller's standpoint, most retail web sites require multi-tiered system architectures involving numerous hardware and software components, and presenting a unified face to the customer requires the complex integration of mission-critical but heterogeneous applications like those involved in marketing, inventory management, payment processing and order fulfillment. For some customers, too, internet-based transactions are more difficult in that they place restrictions on method of payment (usually requiring a credit card, and not accepting gift certificates, exchange credits, cash or checks), and require that the customer wait for goods to be shipped or services to be rendered.

These technological and logistical factors often mean that customers perceive, and react very differently to, the experiences of shopping on the web and in the business's storefront(s), and this "perception gap" creates barriers to increased sales that might be removed with better integration of the business's online and offline presence. For instance, the prohibitive costs associated with maintaining physical inventory in multiple storefront locations prevents many retailers from providing many of their customers access to the full breadth of products they offer, and introduces the possibility that a customer could visit the store, find that an item is not stocked, and go to a competitor's store to buy the item. Also, a business's product line can be greatly affected by the cost of stocking certain products at stores—preventing some businesses from carrying certain slower-selling items, thereby costing them not only the sale of those items but sometimes others as well. For example, certain web-based operations that stock items at few locations, or do not stock certain items at all but merely forward orders to manufacturers or distributors to ship to customers, have come to fill a role that store-based retailers cannot perform economically, thus taking the revenue a store-based retailer might have gotten not only for that product, but for products the store-based retailer might have sold with it (and might, coincidentally, be stocked in the store). Lastly, until recently, most retailers were unable to accept returns of purchases made on their web sites at the store, which not only gave the customer cause to reconsider the purchase, but also required the business to absorb extra shipping costs to transfer the goods back to a central distribution center.

Recognizing the potential benefits, many businesses strive to meet the technological and logistical challenges associated with better integrating online and offline sales channels. However, achieving this goal remains elusive, and those who have come closest to achieving it still bear unnecessary costs as a result. Several retailers, for instance, offer customers the capability, if an item is out of stock, of having a salesperson access a back-office inventory and order-entry system directly from a cashier's register, so that the item can be ordered and shipped to the customer, and payment can be accepted in-store as though a "normal" purchase were being executed. This solution, however, requires that the retailer construct and maintain a customized interface to inventory systems as well as a facility to reconcile payment received in the store with products to be shipped. Further, given that the customer typically perceives the process as compensating for an under-stocked store, it does not allow retailers to minimize the cost of maintaining physical inventory without sacrificing customer satisfaction. At least one electronics retailer takes the additional step of allowing customers to access an "in-store version" of the retailer's web site (typically stored on the retailer's intranet) from kiosks placed throughout the store, from which customers can initiate orders, and pay for those orders in the store. This solution, however, requires that the retailer construct and maintain a separate "in-store version" web site, and deploy separate infrastructure to support it.

SUMMARY OF THE INVENTION

In one embodiment, a method is provided for executing a transaction. The method comprises acts of: (A) a customer initiating, from a terminal located at a vendor's place of business, an order of a first item from the vendor by selecting the first item from a web site affiliated with the vendor; (B) the customer selecting a second item for purchase from the vendor; (C) the vendor accepting payment from the customer at the place of business in return for the first and second items; and (D) the vendor initiating shipment of the first item to the customer, from a location separate from the place of business.

In another embodiment, at least one computer-readable medium is provided having instructions recorded thereon, which instructions, when executed, cause at least one processor in communication with a web site to perform a method. The method comprises acts of: (A) accepting a data object from the web site, the data object describing a first item selected for purchase by a customer from a plurality of items offered for purchase at the web site; (B) recording a payment received from the customer in exchange for the first item and a second item, the second item not selected for purchase from the web site; and (C) initiating, upon receipt of the payment from the customer, a shipment of the first item to the customer.

In yet another embodiment, a system is provided for processing transactions. The system comprises an order component which receives a first data object from a web site, the first data object describing an order of a first item initiated by a customer, the first item requiring shipment to the customer; a purchase component which receives a second data object, the second data object describing a purchase transaction, the purchase transaction involving the first item and a second item, the second data object including an indication of a payment being received in the purchase transaction; a matching component which compares the first and second data objects using at least one data element common to both data objects; and a shipment initiation component which initiates a shipment of the first item to the customer.

The foregoing and other aspects and advantages of the invention will become more readily understood and evident from the detailed description, below, which should be read in conjunction with the accompanying drawings.

DETAILED DESCRIPTION

The present invention, as defined in the claims, provides method and apparatus for enabling a customer of a business to pay for an internet purchase of goods or services at a physical "point of sale" location of the business (i.e., one of its stores), thereby allowing the business to be more selective about the inventory maintained in the store and creating an alternative sales channel, and allowing the customer greater flexibility in terms of payment options and access to a wider variety of products and services. Further, in one exemplary embodiment, a customer may select a first item from those offered for purchase by the business's web site, and a second item from those otherwise offered for purchase by the business (e.g., from stock maintained at the place of business, such as a store), and purchase both the first and second items in a single transaction. The transaction may occur at a single "point of sale," such as a register or the like within the place of business. Thus, in a single transaction and at a single point of sale, a customer may purchase items selected "online" (i.e., from the business's web site) and "offline" (i.e., those otherwise offered by the business, such as stock maintained in the store).

In one embodiment, this may be accomplished via a system, which may be located in the place of business, that receives a first data object from the web site providing information on an item selected by the customer for purchase via the web site, and a second data object which provides information on a subsequent purchase transaction that includes that item and one or more other items not selected from the web site. The information on the purchase transaction may include an indication of payment having been received (e.g., in the place of business, such as a store) for the item ordered via the web site, as well as the one or more other items not selected from the web site (e.g., items selected from inventory maintained in the store by the business). The system may include a component which identifies information in the second data object relating to the item ordered via the web site, and compares this information to the first data object to determine whether payment has been received for the item ordered via the web site. Upon determining that payment has been received for the item ordered via the web site, the system may initiate a shipment of the item to the customer. As an example, the item may be shipped from a location separate from the place of business.

Figure 1:
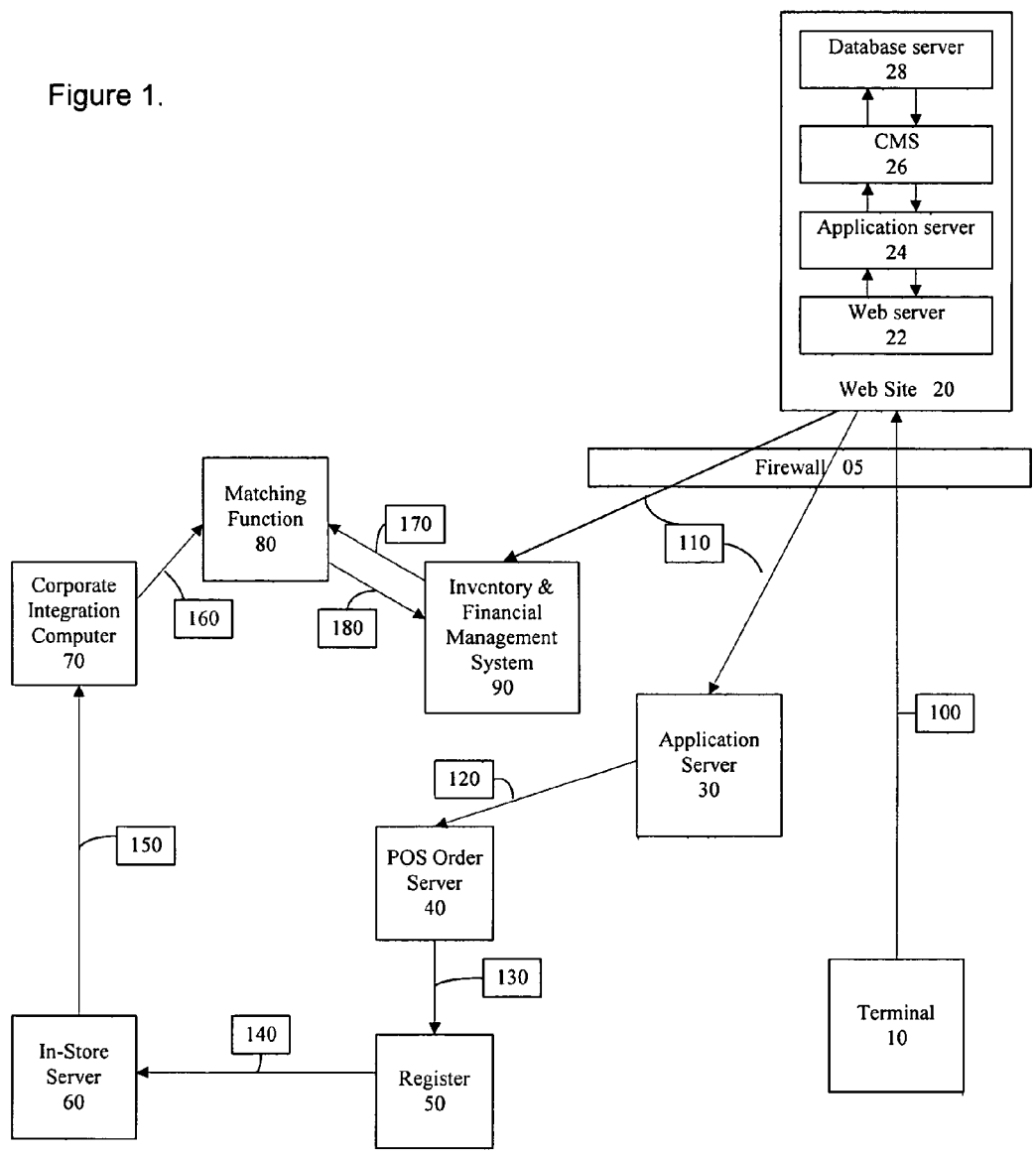
FIG. 1 is a flowchart depicting the operation of an illustrative embodiment of a system as taught herein.

In FIG. 1, blocks are used to represent functional entities, which may or may not be physically distinct (for instance, one computer processor could comprise several functional blocks, and one block may comprise a number of processors). Arcs are used to represent actions and data flow between blocks.

Referring to FIG. 1, which depicts an illustrative embodiment of a system and the flow of information during the use thereof, utilizing the invention, the customer, or a store employee conferring with the customer, initiates an order indicated at arc 100 from Terminal 10, to Web Site 20. Terminal 10 may take any suitable form. For example, Terminal 10 may be a general-purpose computer, a kiosk which operates only to access a networked application, a personal digital assistant (PDA), or a web-enabled cell phone, among numerous possibilities. Terminal 10 may achieve communication with Web Site 20 via the internet, a dedicated communications link, or any other suitable means. A customer using Terminal 10 may initiate access to Web Site 20 from within a place of business (e.g., a store) or from outside the place of business, depending on the customer's wishes. The terminal may execute a browser application and/or other applications, such as those integrated with the browser. In the embodiment depicted, the terminal is a kiosk located in the store which is able to access multiple networked applications using an interface (created by appropriate software) providing a standard "tool bar" metaphor which will be readily appreciated by those skilled in the art. Terminal 10 establishes communication with the web site through any appropriate communication protocol, such as TCP/IP, and may achieve internet access via an internet service provider (ISP). The order on the web site, in the embodiment shown, may be executed via a series of standard HTTP requests. In other embodiments, other communications protocols and request methods might be employed.

Web Site 20 (in particular, Web Server 22) processes the requests initiated by Terminal 10. In the embodiment shown, Web Site 20 identifies the requests as indicating an order as being placed from Terminal 10, such as an order being initiated from a kiosk within the store. The identification of Terminal 10 may be IP-based (through either the identification of an individual IP address, or the routing of several terminal IP addresses through one or more common, or masked, IP addresses provided by the internet service provider), cookie-based, or using any other suitable technique. The Web Server 22 employed by the Web Site 20 may utilize any suitable technology, including Microsoft Windows NT, Microsoft IIS, the Apache Group's web server, or others.

In the embodiment depicted, Web Site 20 serves content to Terminal 10, which content is specific to store-initiated transactions. This may be accomplished, for example, using application server 24, content management system 26, and database 28. The functions performed by these components will be readily appreciated by those skilled in the art. The provision of content to Terminal 10 may also be accomplished, for example, by establishing content "areas" within Web Site 20's content layout which are specifically designed to facilitate store-based transactions. However, the invention is not limited in this respect, as content may be maintained in any suitable fashion.

In the embodiment depicted, when the customer finalizes a selection of items offered for sale via Web Site 20, a hard copy confirmation is preferably printed (e.g., by a sales associate assisting the customer, or by the customer) at Terminal 10. A communication indicating the selection, hereinafter referred to as a "web order", is transmitted in arc 100 to Web Site 20. For example, the customer may click on a "finalize selection" button or the like in content provided by Web Site 20 to transmit the communication via arc 100.

As described above, the customer may opt to purchase items offered via Web Site 20 and items offered as in-store stock in a single transaction (e.g., at a point of sale maintained by the business, such as a register within a store). In one embodiment, if a customer selects for purchase items which are offered via Web Site 20 and items which are offered as in-store stock, the communication sent by Terminal 10 to Web Site 20 in arc 100 describes only the items selected via Web Site 20. However, the invention is not limited in this respect, as the communication sent in arc 100 may include any suitable information.

In the embodiment depicted, Web Site 20 transmits data describing the web order in arc 110 to Application Server 30 and Inventory & Financial Management System 90. These and other transmissions may be accomplished via a communication channel, and may occur over a network firewall 5, as shown. In one embodiment, the communication channel may be akin to a "pipe", with preferably defined starting and ending points at specific IP addresses, which may also be the single entry and exit points for data. The communication channel described herein may be constructed using commercially available messaging software, such as IBM's MQ series, or proprietary messaging software, as appreciated by those skilled in the art. This messaging software may facilitate point-to-point data transfer using industry-standard communication hardware, which will also be appreciated by those skilled in the art.

The communication channel desirably has a security function which is suitable for handling sensitive data such as that which describes a purchase, and desirably provides for data persistence for managing failures and outages over time. It preferably is cable of processing large volumes of data efficiently, is networking protocol-independant (i.e., supports TCP/IP, FTP, SMTP and others), supports data transmission between heterogeneous computing platforms (e.g., from a UNIX to an NT environment), and transmits data regardless of its format (e.g., EBCDIC, ASCII, etc.).

In the embodiment shown, the transfer of data in the channel is uni-directional, although the channel messaging software may support bi-directional data flow. In alternative embodiments the flow of data may be either uni-directional or bi-directional depending on system and security requirements. In the embodiment shown, no acknowledgement is given of data transmitted at the starting point, or received at the ending point, but in other embodiments, this acknowledgement may be required or, in any event, provided. Finally, the communication channel may transmit data on a synchronous or asynchronous basis. Depending on system requirements, the channel may possess any combination of the features described herein, but shall not be limited to a combination of the characteristics listed.

In the embodiment shown, Web Site 20 transmits data to Application Server 30 in arc 110 in text file ASCII format, representing the web order placed on Web Site 20. To accept this data via the communication channel and across the network firewall in the embodiment shown, Application Server 30 executes specific instructions enabling receipt of data via these means, as will be appreciated by those skilled in the art. Upon receipt, Application Server 30 parses this text file and creates a binary object which, in the embodiment shown, is a COM component. In this embodiment, the text file is converted into the binary object/COM component to conform with the object-oriented system design based on Microsoft's Component Object Model software architecture deployed, as will be well-understood by those skilled in the art. Those skilled in the art will also be able to suggest other modular and non-modular programming techniques, and other component architectures, which may be employed for order processing to achieve similar objectives in alternative embodiments. In this embodiment, the binary object will be a self-contained module containing both the data and the processing to be performed on it.

In arc 120, the object is transferred from Application Server 30 to Point Of Sale Order Server 40 which, in the embodiment shown, is not physically located in the store. In this embodiment, the Point Of Sale Order Server 40 contains a suitable database, such as an SQL-based database, for these objects. Other embodiments may employ alternative database technologies, or another form of electronic file storage altogether, and this electronic file storage may store data other than these objects. The database may perform validation on the objects to insure that web order data conforms to predefined standards, and that data transfer has completed successfully.

Figure 2:
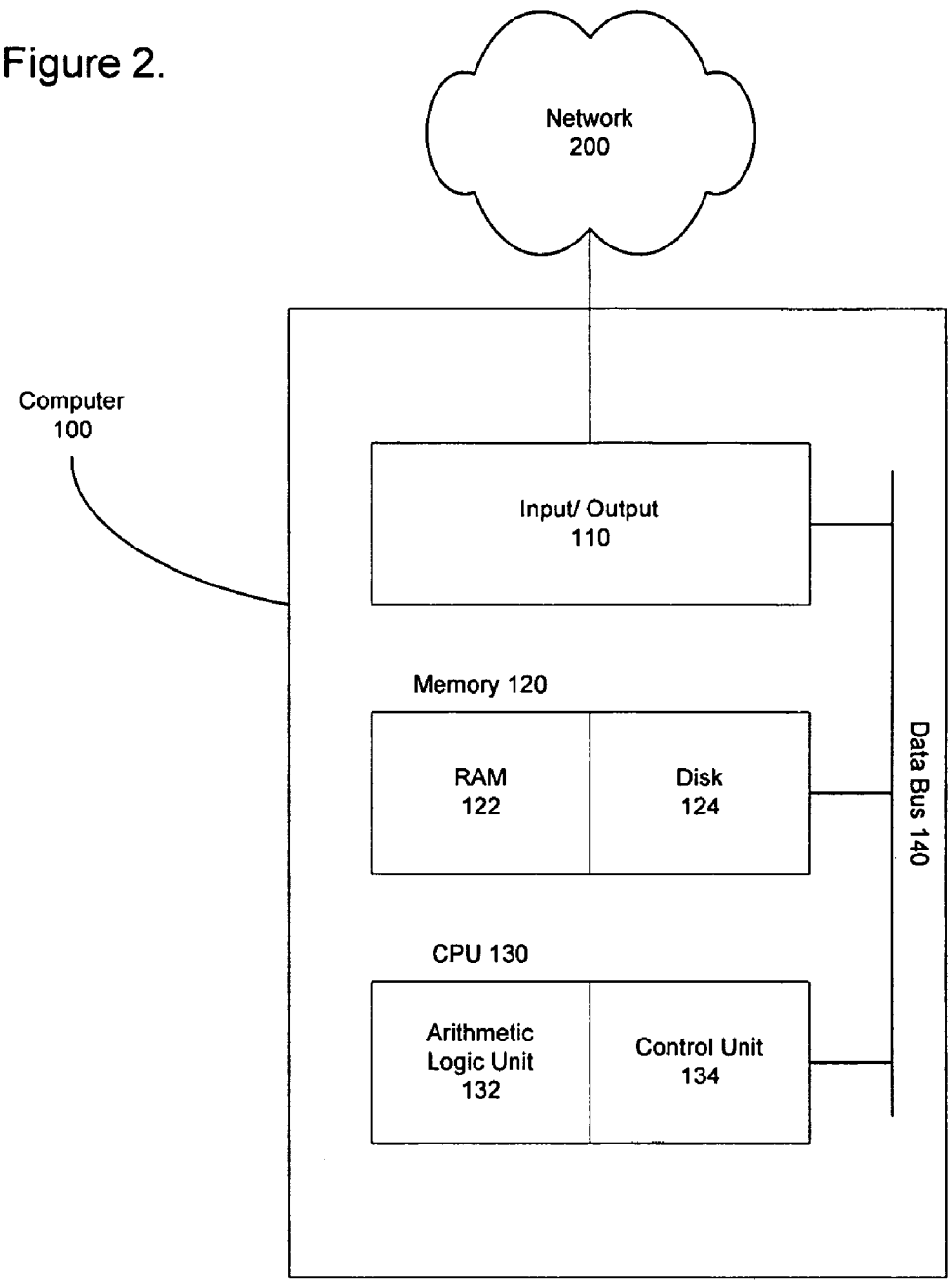
FIG. 2 is a block diagram depicting a computer used to perform processing enabling such systems.

Referring to FIG. 2, which depicts a computer which might comprise Point Of Sale Order Server 40, data is accepted from Network 200 into Computer 100 via a network port comprising an Input/Output Device 110. Data is then transferred to Memory 120 via Data Bus 140, where, in this embodiment, it will be at least partially loaded to Random Access Memory (RAM) 122 for processing by Central Processing Unit (CPU) 130, including processing required to load the data into a database stored in Disk(s) 124. CPU 130 may perform additional processing to validate the data either before or during its loading to the database. In other embodiments, data may remain in RAM 122, or may be stored in Disk(s) 124 in a non-database format, as dictated by system requirements.

Referring again to FIG. 1, in this embodiment, as data transfer between Application Server 30 and the Point Of Sale Order Server 40 occurs, the customer, who has optionally printed out a hard copy paper confirmation of his or her web order at the terminal, takes that confirmation to Register 50 within the store. In other embodiments, the customer may take the confirmation to another store location, and/or may not require the paper confirmation to proceed with the transaction.

In this embodiment, the paper confirmation of the web order contains an identification of the web order object which is stored in Point Of Sale Order Server 40. That identification may, for example, be an alphanumeric code, machine-readable code (e.g., a bar code) or any other suitable identifier. When the store employee initiates a "pay at point of sale" transaction using a register key and inputs the identification of the web order, or scans the machine-readable (e.g., bar) code, a software module running on Register 50 initiates the extraction of the web order object from Point Of Sale Server 40 in arc 130, so that processing of payment for items included in the web order (and/or any items otherwise selected for purchase, such as from in-store stock) may occur at Register 50. Thus, in a single transaction and at a single point of sale, a customer may purchase items selected "online" (i.e., from the business's web site) and "offline" (i.e., those otherwise offered by the business, such as stock maintained in the store).

In the embodiment shown, an interface running on Register 50 may be an interface encoded using Visual C++, as will be appreciated by those skilled in the art, and may be customized to facilitate efficient access to the SQL database on Point Of Sale Order Server 40. Of course, alternative interfaces may be employed.

Moreover, extraction of web order information need not be performed via a software module executing on Register 50. For example, Register 50 may execute a browser application through which the SQL database on POS Order Server 40 is accessed (e.g., by a store clerk), and/or any other suitable techniques may be employed to access web order data on Point Of Sale Server 40.

There may also, of course, be multiple register clients throughout the store.

If web order information is extracted successfully from Point Of Sale Server 40 at Register 50, a store employee and the customer may complete the transaction by exchanging payment. As described above, payment may entail any consideration given in exchange for items selected from the web site, and other items such as those which are chosen from in-store stock. Payment may entail any consideration accepted by the seller, including legal tender, gift certificate, exchange of goods, and credit card payment, or a combination thereof. Once payment is received, the store employee operating the register may indicate, as with any other transaction, that the transaction is complete, and the web order transaction may be updated to reflect payment receipt.

If the web order is not successfully extracted from Point Of Sale Server 40 at Register 50, in the embodiment shown, the cashier may be prompted to manually input the web order number printed on the confirmation from Web Site 20.

In the embodiment shown, all transactions are transmitted to In-Store Server 60 in arc 140 for storage thereon. In the depicted embodiment, In-Store Server 60 may be a Microsoft Windows NT 4.0 server, although other server platforms may be employed.

Figure 3:
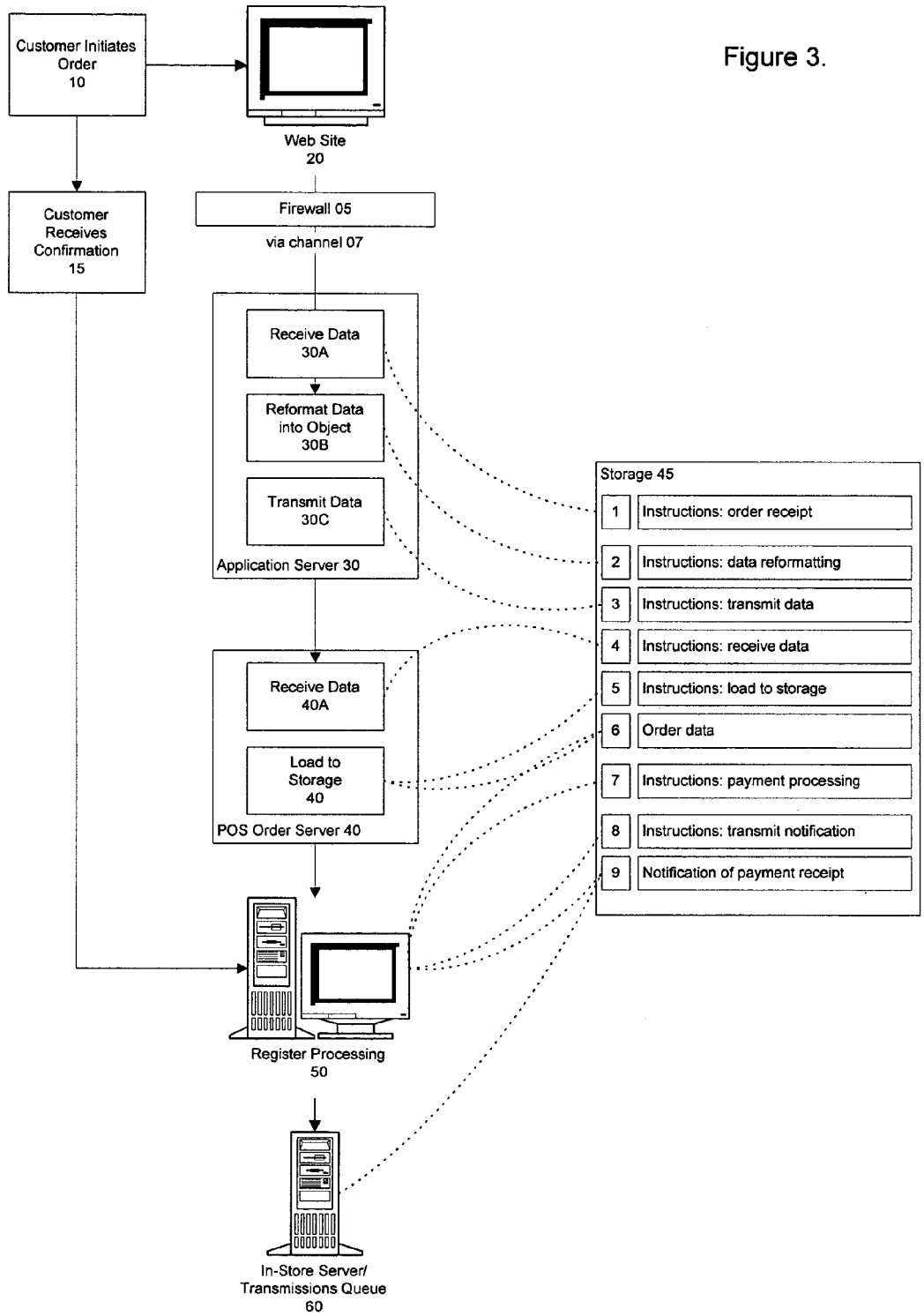
FIG. 3 is a flowchart depicting in-store processing for one method embodiment as taught herein.

Referring to FIG. 3, which depicts data flow, retrieval, and storage during one embodiment of point-of-sale processing, data describing the customer's web order is sent by Web Site 20, across Firewall 05 and via Channel 07, to Application Server 30, which receives the data in block 30A, reformats the data in block 30B, and transmits it to Point Of Sale Order Server 40. Point Of Sale Order Server receives the data in block 40A and loads it to Storage 45 in block 40B. Within Storage 45, which may represent a single storage device or several storage devices, data representing instructions on various processing steps, as well as web orders themselves, is stored at memory addresses 1-9. These memory addresses are accessed by the components shown, as depicted, throughout point-of-sale processing. Register Processing, including payment receipt, is completed at block 50. Data representing the completed web order resides in Storage 45 until its transmission to the In-Store Server 60.

Depending on the embodiment, Storage 45 may comprise a single computer-readable medium resident in a single hardware component, multiple computer-readable media resident in a single hardware component, or multiple computer-readable media resident in multiple hardware components.

Referring again to FIG. 1, in arc 150 In-Store Server 60 transmits transaction data (e.g., over a second communication channel) to Corporate Integration Computer 70, which serves as a landing spot for the data until it is extracted by Matching Function 80. In one embodiment, the transaction data may include an indication of item(s) selected for purchase from Web Site 20 (i.e., the web order) and item(s) otherwise selected for purchase (e.g., those taken from in-store stock). In this embodiment, In-Store Server 60 initiates the transmission on a real-time basis; in other embodiments Computer 70 may initiate an extraction from Server 60, and this may occur on a batch mode or real-time basis, using FTP or other file transfer software. In the embodiment shown, Corporate Integration Computer 70 may, for example, be an IBM AS/400 computer or the like, which may store transaction data in a DB2 (or other) database.

Matching Function 80 compares transaction data (received from Server 60 in arc 150) with the original web order information (received from Web Site 20 as indicated by arc 110, via Inventory & Financial Management System 90 in arc 170). The Matching Function's purpose is to ensure that correct payment has been received for items included in the web order. Thus, if the transaction data includes information on items selected for purchase via Web Site 20 and items selected from in-store stock (as an example), the Matching Function may operate only on information related to the items selected for purchase via Web Site 20 (i.e., web orders). Information related to web-ordered items may be identified, for example, using the indication included in the transmission of arc 150.

Figure 4:
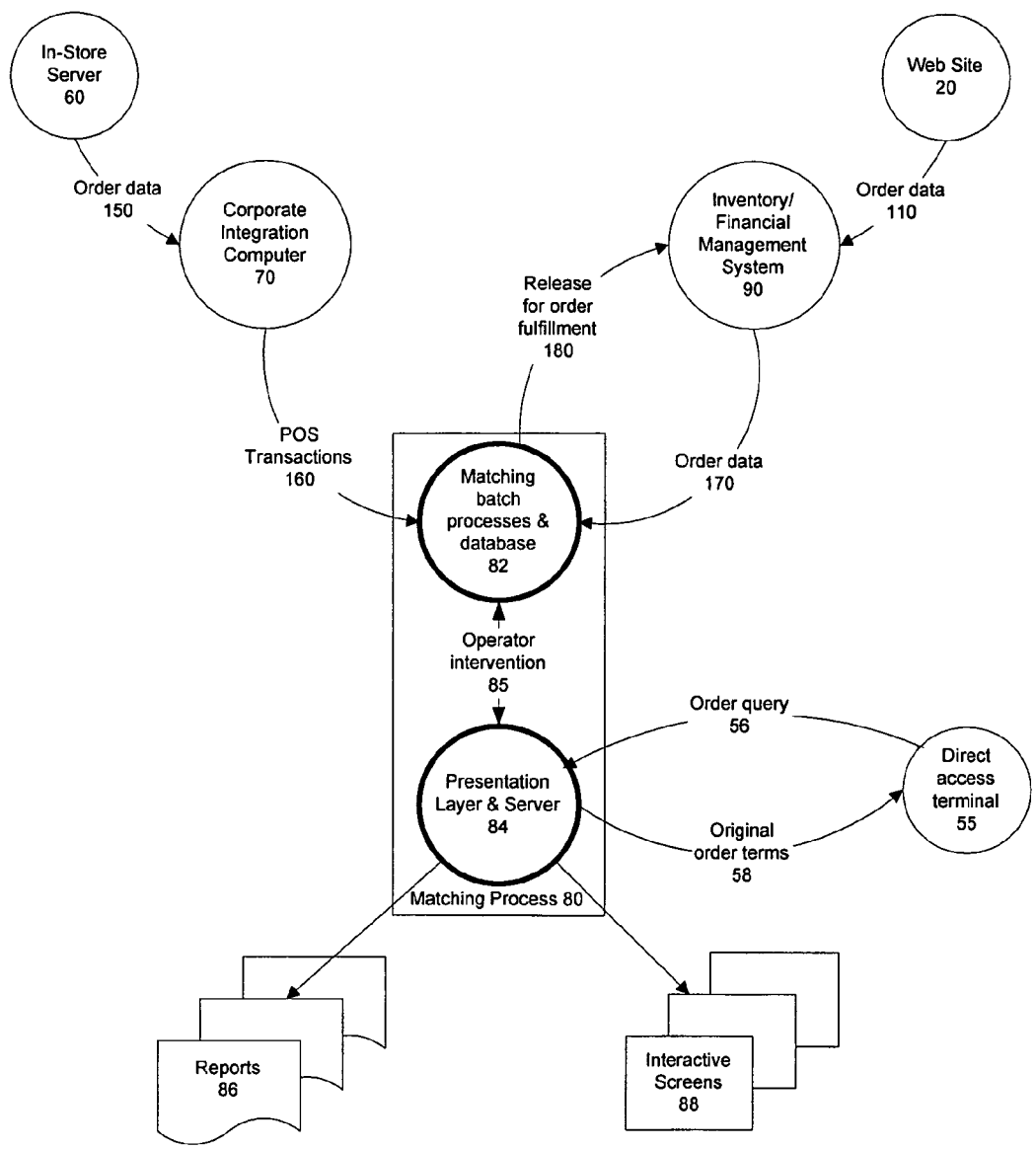
FIG. 4 is a block diagram depicting matching processing for some embodiments of the systems and methods.

Referring to FIG. 4, which depicts the processing flow inherent in Matching Function 80 in this embodiment, web order data is transmitted to Corporate Integration Computer 70 in arc 150, where it will sit until Matching Function 80 initiates its extraction in arc 160. Similarly, web order data is transmitted from Web Site 20 to Inventory & Financial Management System 90 in arc 110, where it will reside until Matching Function 80 initiates its extraction in arc 170. In this embodiment, these extractions in arcs 160 and 170 are accomplished using FTP, although in other embodiments, extraction might be accomplished using other file transfer applications. Matching Function 80 accepts this data and processes it using Matching Batch Processes 82.

Figure 5:
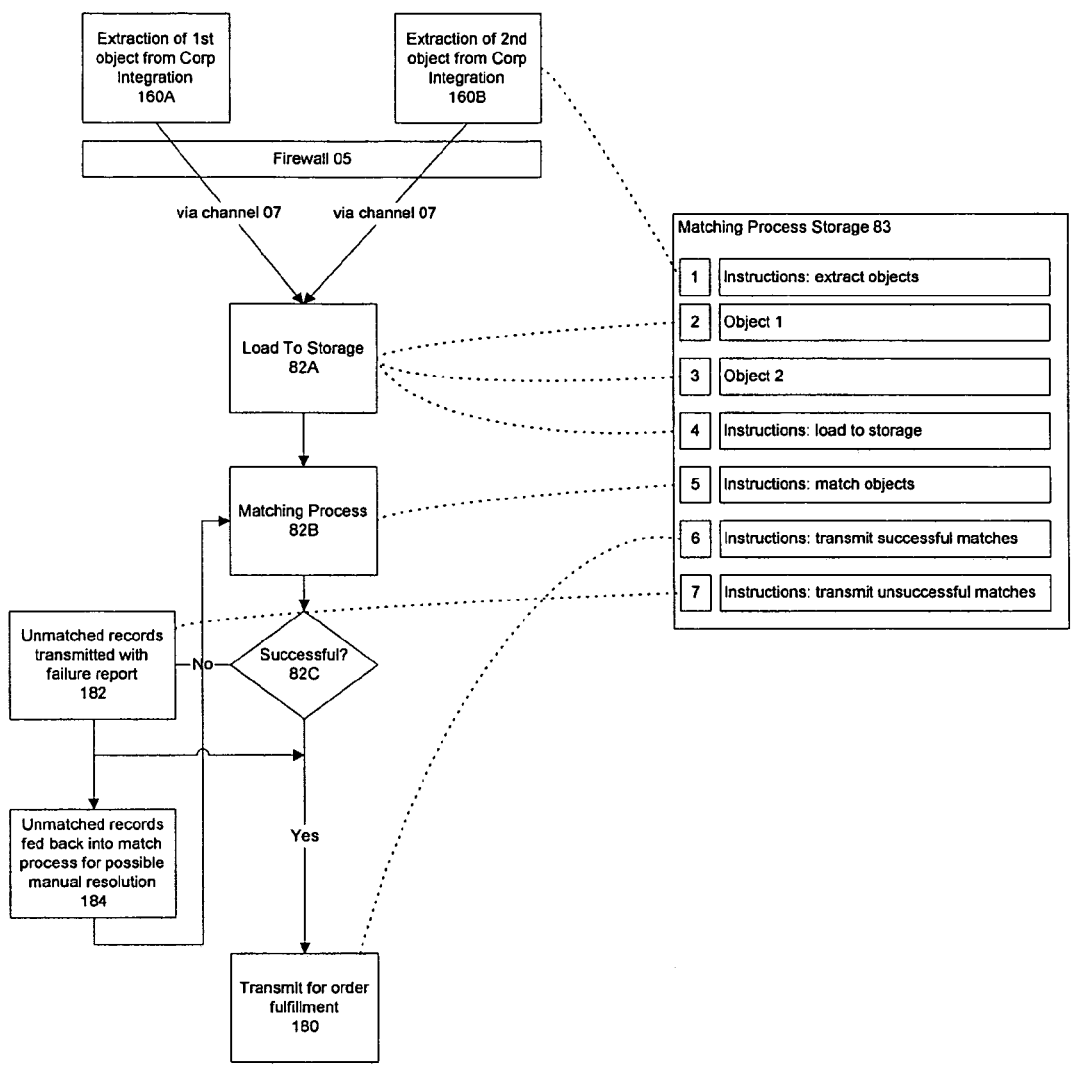
FIG. 5 is a flowchart depicting detailed match processing for some embodiments of systems and methods as taught herein.

FIG. 5 depicts in detail a suitable matching process as may be used in this embodiment. In the embodiment shown, data objects representing both web order transactions and payment transactions are extracted in 160A and 160B, though not necessarily respectively, over Firewall 05 and via Communications Channel 07. Data is loaded to Matching Process Storage 83 in block 82A. Within Storage 83, which may represent a single storage device or several storage devices, data representing instructions on various processing steps, as well as web order and payment transactions, are stored at memory addresses 1-7. These memory addresses are accessed by the components shown, as depicted, throughout match processing. Depending on the embodiment, Storage 83 may comprise a single computer-readable medium resident in a single hardware component, multiple computer-readable media resident in a single hardware component, or multiple computer-readable media resident in multiple hardware components.

Matching Process 82B then accesses payment and web order transaction data residing in Storage 83, and attempts to match data based on elements explicitly common to both types of records. In alternative embodiments, Matching Process 82B may employ fuzzy logic, or other matching techniques, as required. In the embodiment shown, extraction and match processing occur in batch mode on a predetermined basis. In other embodiments, extraction and/or processing may occur in real time. Also in the embodiment shown, if a match between a payment transaction record and a web order transaction record is established by either Matching Batch Process 82B, a positive notification message is transmitted for the web order to Inventory & Financial Management System 90 in 180, so that it can be fulfilled. If no match is found, a negative notification is transmitted to Inventory & Financial Management System 90, also in 180. In the embodiment shown, positive and negative notifications are transmitted on a predetermined schedule to Inventory & Financial Management System 90; in other embodiments, this transmission may occur in real-time, and negative notifications might not be transmitted at all.

Referring again to FIG. 4, Matching Function 80, in the embodiment shown, also includes a facility for direct input by operators in Presentation Layer 84. In the embodiment shown, once Matching Batch Processes 82 completes its (automated) attempt to match payment transactions and web order transactions, operators using Presentation Layer 84 may intervene in 85 to attempt to match unmatched records produced as output from Matching Batch Processes 82. Web order records might remain unmatched after Matching Batch Processes 82 due to, for example, data element mismatches or other causes. In 85, an operator may intervene to manually match records based on predefined business rules designed to identify matches not otherwise identified by automated processes. For example, if the price on a payment transaction does not match the price on a web order transaction, but falls within a predefined tolerance level, the operator may release the web order to be shipped.

Matching Database 82 may comprise a commercially available database or other electronic file storage to store data pertinent to the purchase, such as payment plans, tax schedules, or other data specific to particular transactions not stored within In-Store Server 60. This feature 82 removes the need for data storage within individual stores, and also enables data sharing across stores, thereby facilitating easier store-to-store transfers or returns. In other embodiments, however, this data may be maintained at each store location.

In the embodiment shown, Matching Process 80 also includes a facility allowing direct access to web order data by store employees at remote locations. Using Direct Access Terminal 55, store employees may determine the terms under which a web order was originally placed, so that, for instance, a store employee can see the tax that was paid for a web order. Store employees accomplish this by initiating Order Query 56 to Matching Process Presentation Layer 84, which in turn provides access to Order Database 82. The Original Order Terms 58 are then returned to Direct Access Terminal 55 for viewing by the store employee. In the embodiment shown, communications between Direct Access Terminal 55 and Matching Process 80 are accomplished using Wide Area Network (WAN) technology, as will be appreciated by those skilled in the art. In other embodiments, communications may be established using a dial-up connection or other means.

Figure 6:
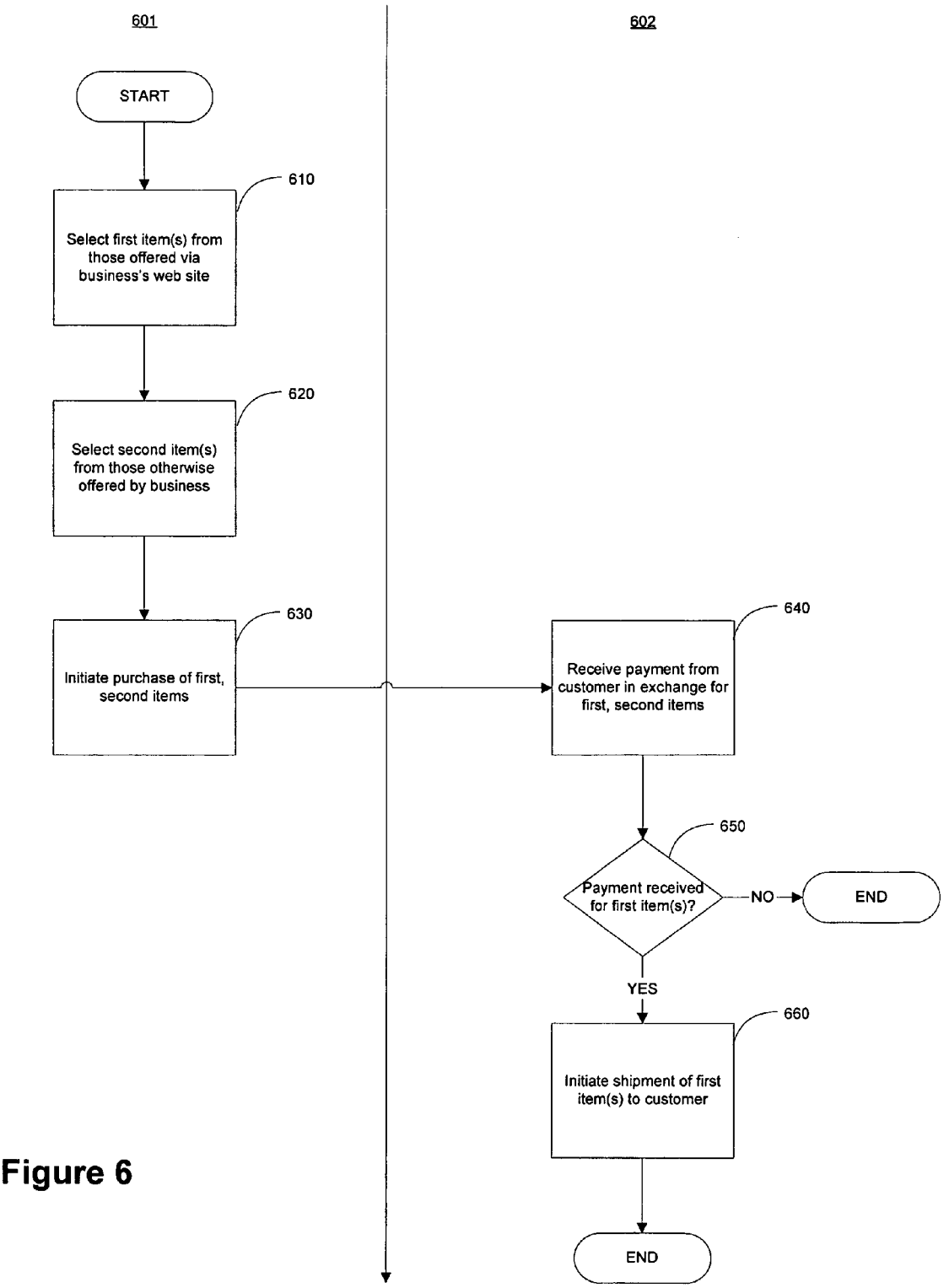
FIG. 6 is a flowchart depicting an exemplary method by means of which a customer may initiate a transaction, according to one embodiment of the invention.

As described above, a customer may initiate a purchase transaction which includes one or more items selected from Web Site 20 (FIG. 1) and one or more items otherwise selected (e.g., from stock maintained in a store). FIG. 6 depicts a method by means of which such a transaction may be completed. FIG. 6 includes two columns indicating acts which are performed by the customer (i.e., in column 601) and by the business (i.e., in column 602).

Upon the start of the process, in act 610 the customer selects for purchase one or more first items offered via a web site affiliated with the business. Selection may be initiated, for example, via communication between Terminal 10 and the web site according to techniques described above. The customer may, as described above, receive a hard copy record reflecting the first item(s) selected via the web site.

In act 620, the customer selects one or more additional items for purchase, such as those which are made available for selection from in-store stock. These additional items may comprise any desirable goods and/or services, including those which are offered for sale via the web site but which the customer does not wish to purchase via the web site. For example, a customer may opt to select an item offered via the web site from in-store stock rather than purchase it from the web site because the customer wishes to take the item with him/her immediately, rather than waiting for the item to be shipped to him/her. Of course, the converse is true, and the customer may opt to purchase an item offered from in-store stock from the web site instead. For example, the item may be large or cumbersome, such that the customer would prefer that it be shipped to a location rather than transporting it there themselves. Alternatively, the item may normally be offered from in-store stock but may be presently out of stock, such that the customer may wish to order the item from the web site and have it shipped to him/her immediately rather than wait for it to be re-stocked in the store. Further, the stock maintained at the store may only partially satisfy the customer's needs, such that the customer may select the quantity of the item which is in stock and order an additional quantity from the web site.

In act 630, the customer initiates a purchase of the first and second items selected in acts 610 and 620. As described above, the customer may initiate a purchase transaction by approaching a register within the store with a hard copy record showing first items selected via the web site and the second item(s) in hand, and prepare to provide suitable tender in exchange for the first and second items.

In act 640, the business receives payment from the customer in exchange for the first and second items. This act may be performed in any suitable fashion, as the invention is not limited in this respect. For example, the business may receive cash payment in exchange for the first and second items. The amount received in exchange for the first item(s) ordered via the web site may be, for example, an amount reflected on a hard copy record received by the customer in act 610. The customer may then exit the place of business with the second item(s) in his/her possession. The customer may also be given a hard copy record of the transaction (e.g., a paper receipt) which includes notations indicating the first items selected from the web site and the second item(s).

In act 650, a determination is made whether payment has been appropriately received for the first item(s) ordered via the web site. This determination may be performed, for example, according to the techniques described above with reference to FIGS. 4-5. If it is determined that payment has been received for the first item(s), the process proceeds to act 660, wherein the business initiates a shipment of the first item(s) to the customer, and the process completes. If it is determined that payment has not been received for the first item(s), the process ends as well. For example, a cashier may initiate a separate process of investigating why it was determined that payment was not received for the first item(s).

It should be appreciated that the acts described above need not be completed in the order described. For example, a customer may first select one or more items for purchase from in-store stock, and then select one or more items for purchase from items offered via a web site. Further, each of acts 610 and 620 may be repeated as desired. For example, a customer may select a first item for purchase via a web site, then select a second item from in-store stock, then return to the web site to select a third item, and then purchase all three items in a single transaction. The invention is not limited in to any particular sequence or number of acts, and may be implemented in any suitable fashion.

In one embodiment, a customer may return purchased items, including those selected from the web site and/or other items, to the business (e.g., to a store maintained by the business) in exchange for appropriate consideration. For example, the customer may bring the items to the store with a receipt from the transaction, and an employee in the store may process the return by entering an identifier for the purchase (e.g., found on the receipt) into a point of sale system, which may allow the employee to view the items included in the transaction. Upon confirming that the returned item was included in the purchase transaction, the employee may receive the returned item in exchange for consideration such as cash, credit, exchange and/or other consideration. In one embodiment, a customer may return a purchased item to any store maintained by the business, and not only the store at which the purchase transaction took place.

Referring again to FIG. 1, in alternative embodiments, the information flow described in the foregoing may be accomplished with different combinations of hardware and software. For instance, in one possible alternative embodiment, components 30, 40, 50, and 60 may comprise separate applications running on one computer. In another possible embodiment, each of these components may be distributed or replicated across many computers (for instance, Application Server 30 functionality might execute simultaneously on multiple pieces of hardware, and may or may not function as a single collective processor, depending on the volume of web order data to be processed or the response time desired. To fulfill the requirements of the embodiment depicted in FIG. 1, each hardware component might receive web order data from Web Site 20 through separate, distinct communications hardware, or communications might be routed through a single hardware component for dissemination to all others.) Likewise, in other embodiments, components 70, 80, and 90 may also execute as separate applications on one computer, or each may be distributed across numerous hardware components.

In still other embodiments, hardware and software components in addition to those shown may also impose a security function on the system overall. Through the security function, transmitted data at any point shown in FIG. 1 may be encrypted or otherwise altered in order to prevent outside access. Additionally, while FIG. 1 depicts only one firewall, multiple firewalls may be employed to restrict communications between corporate systems, store systems, the web site, or any combination thereof. In particular, in many embodiments, a second firewall will be employed between components maintained at the physical store location (like components 50 and 60) and so-called "corporate applications" like those shown in boxes 30, 40, 70, 80 and 90. These firewalls may be maintained and operated either by the business or its internet service provider(s).

It should be appreciated from the foregoing that methods and apparatus for integrating online and offline commerce are shown. A customer may make a purchase which includes one or more items selected from a web site and one or more items otherwise offered by a business, in a single transaction and at a single point of sale (e.g., at a store maintained by the business). The customer may also return any of the items, including those selected from the web site, at any store related to the business.

The functionality described herein typically is provided with computer program instructions stored on one or more computer-readable media. Such media may include, without limitation, read-only memory, random access memory, magnetic storage and optical storage, variations of the foregoing and any combination thereof, as depicted with Memory 120 in FIG. 2. When such instructions are executed by appropriate computers, such as the terminals and servers described above, these computers act as described.

While the invention has been particularly shown and described with reference to specific embodiments, these embodiments are presented by way of example only, as it is not possible to enumerate all potential implementations. It should be understood by those skilled in the art that various changes in form and detail may be made therein without departing from the spirit and scope of the invention, which is defined in the following claims.

What is claimed is:

1. A method for executing a transaction, comprising acts of:
   (A) receiving an order initiated by a customer from a terminal located at a vendor's place of business, the order comprising a first item selected for purchase from a web site affiliated with the vendor;
   (B) processing, via software associated with the web site, the order to generate data relating to the order, the data relating to the order comprising an indication of a price of the first item;
   (C) transmitting the data relating to the order, via a secure communication channel which connects a first network address accessible by the web site to a second network address accessible by a computer operated by the vendor, the first and second network addresses comprising the only entry or exit points for data transmitted via the secure communication channel;
   (D) acknowledging a selection by the customer, from items at the vendor's place of business, of a second item for purchase;
   (E) recording, via software executable from the vendor's place of business, a payment from the customer at the place of business in return for the first item selected for purchase from the web site and the second item selected from the items at the vendor's place of business;
   (F) accessing, via software executable from the vendor's place of business, the data transmitted via the secure communication channel relating to the order;
   (G) comparing, via software executable from the vendor's place of business, the payment recorded in the act (E) for the first item to the indication of the price of the first item in the data relating to the order, to determine whether the payment received for the first item is appropriate; and (H) upon determining that the payment received for the first item is appropriate, initiating shipment of the first item to the customer, from a location separate from the vendor's place of business.

2. The method of claim 1, wherein the act (C) further comprises transmitting the data relating to the order across a network firewall.

3. The method of claim 1, wherein the act (H) further comprises transmitting a notification of payment received to a module which performs shipment processing.

4. The method of claim 1, wherein the first and second items are different items.

5. The method of claim 1, wherein the act (G) further comprises determining that the payment recorded in the act (E) in return for the first item is not appropriate if the payment does not match the indication of the price of the first item in the data relating to the order.

6. At least one computer-readable medium having instructions recorded thereon, which instructions, when executed, cause at least one processor in communication with a web site to perform a method comprising acts of:

(A) transmitting a data object, via a secure communication channel which connects a first network address accessible by the web site to a second network address accessible by a computer operated by a vendor, the first and second network addresses comprising the only entry or exit points for data transmitted via the secure communication channel, the data object describing a first item selected for purchase by a customer from a plurality of items offered for purchase at the web site, the data object comprising an indication of a price of the first item;

(B) accepting, at the computer operated by a vendor, the data object from the web site;

(C) recording a payment received from the customer in exchange for the first item and a second item, the second item selected for purchase by the customer from items at the vendor's place of business;

(D) accessing the data object accepted from the web site in the act (B);

(E) comparing the payment recorded in the act (C) for the first item to the indication of the price of the first item in the data object, to determine whether the payment received for the first item is appropriate; and (F) initiating, upon determining that the payment received for the first item is appropriate, a shipment of the first item to the customer.

7. The at least one computer-readable medium of claim 6, wherein the act (A) further comprises accepting the data object across a network firewall.

8. The at least one computer-readable medium of claim 6, wherein the act (A) further comprises creating a data object incorporating information on the first item and information on processing to be performed on the data object.

9. The at least one computer-readable medium of claim 6, wherein the act (B) further comprises recording a payment which is received from the customer in the place of business, and the act (E) further comprises shipping the first item from a location which is separate from the place of business.

10. The at least one computer-readable medium of claim 6, wherein the act (E) further comprises, upon receipt of the payment, transmitting a notification of the payment being received to a module which performs shipment processing.

11. The at least one computer-readable medium of act 9, wherein the act (C) further comprises determining that the payment recorded in the act (B) in return for the first item is not appropriate if the payment does not match the indication of the price of the first item in the data object.

12. A system for processing transactions, comprising:

a secure communication channel which connects a first network address accessible by a web site to a second network address accessible by a computer operated by a vendor, the first and second network addresses comprising the only entry or exit points for data transmitted via the secure communication channel;

an order component which receives a first data object transmitted from the web site to the computer operated by the vendor via the secure communication channel, the first data object describing an order of a first item initiated by a customer from the web site, the first item requiring shipment to the customer, the first data object comprising an indication of a price of the first item;

a purchase component which generates a second data object, the second data object describing a purchase transaction, the purchase transaction involving the first item and a second item selected for purchase from items at the vendor's place of business, the second data object including an indication of a payment being received for the first item in the purchase transaction;

a matching component which compares the indication of the payment received for the first item in the second data object to the indication of the price of the first item in the first data object, to determine whether the payment received for the first item is appropriate;

a shipment initiation component which, upon a determination by the matching component that the payment received in return for the first item is appropriate, initiates a shipment of the first item to the customer.

13. The system of claim 12, further comprising a network having a firewall, wherein the order component receives the first data object across the network firewall.

14. The system of claim 12, further comprising an electronic file storage in which the first data object is stored.

15. The system of claim 12, further comprising a module which performs shipment processing, wherein the shipment initiation component initiates a shipment of the first item to the customer by transmiffing a notification of the shipment to the shipment processing module.

16. The system of claim 12, wherein the a matching component is further operable to determine that the payment received in return for the first item is not appropriate if the indication of the price of the first item recorded in the first data object does not match the indication of the payment received recorded in the second data object.

* * * * *